March 26, 1963 A. M. BROWN 3,082,501
SEALING SEPARABLE FASTENER
Filed March 4, 1959 2 Sheets-Sheet 1
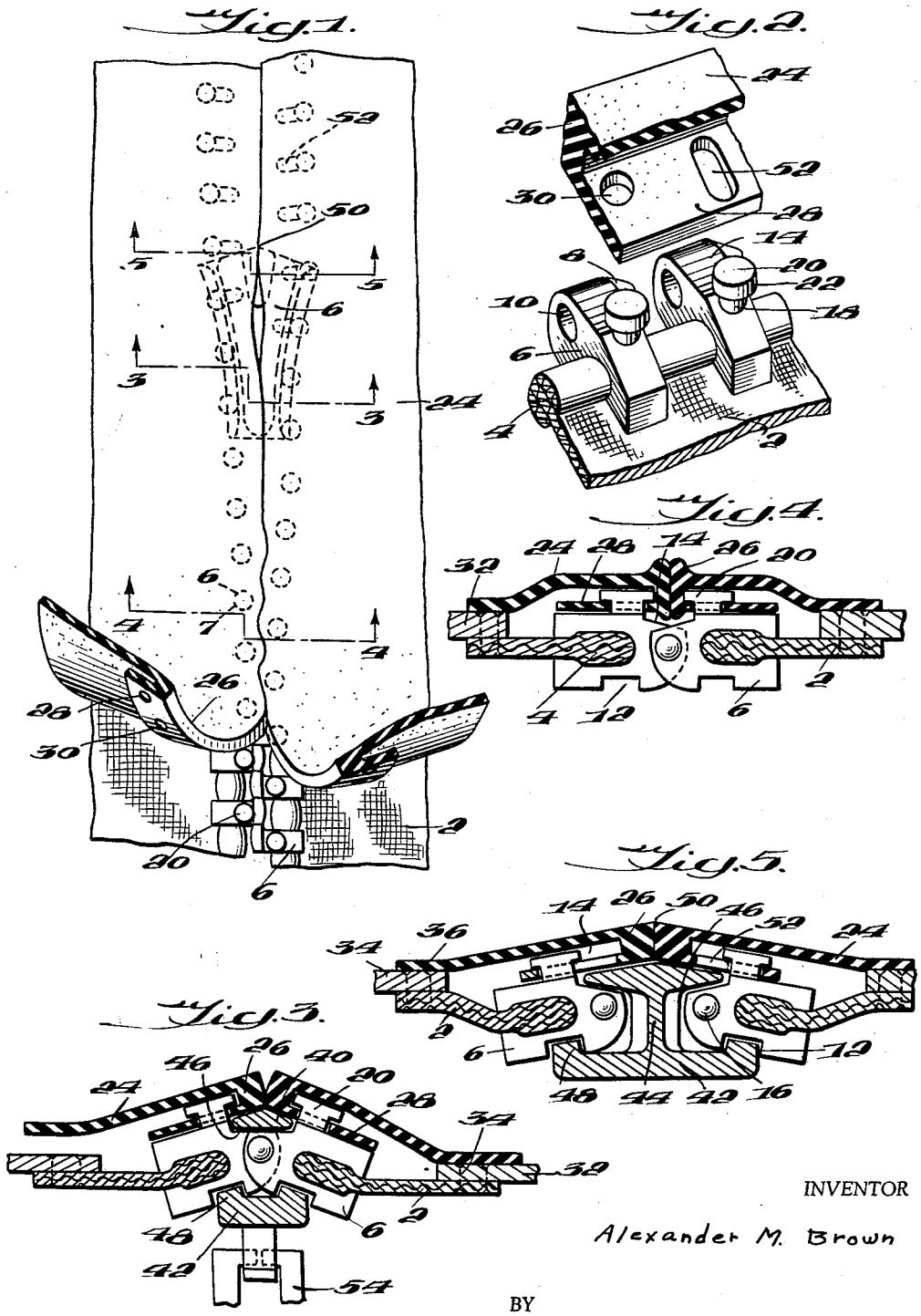
INVENTOR
Alexander M. Brown
BY
Bailey, Stephens & Huettig
ATTORNEYS March 26, 1963  A. M. BROWN  3,082,501
SEALING SEPARABLE FASTENER
Filed March 4, 1959  2 Sheets-Sheet 2
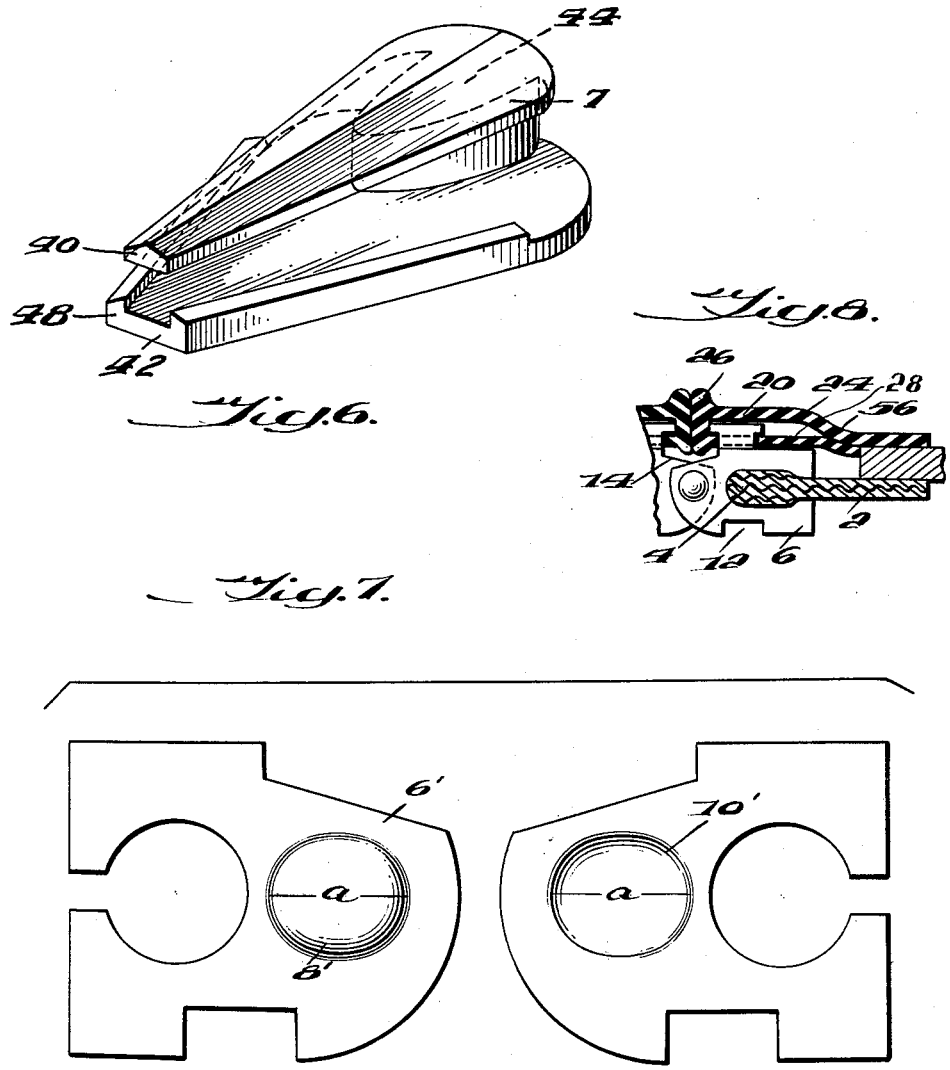
INVENTOR
Alexander M. Brown

United States Patent Office 3,082,501
Patented Mar. 26, 1963

3,082,501
SEALING SEPARABLE FASTENER
Alexander M. Brown, Holly Hill, Fla.
(1033 Continental Drive, Daytona Beach, Fla.)
Filed Mar. 4, 1959, Ser. No. 797,119
14 Claims. (Cl. 24—205.1)

The invention relates to separable fasteners, and more particularly to sealing fasteners of this type.

There have been many forms of separable fasteners suggested for sealing an opening in a garment or the like against liquids and gases. However, all of these which have given a satisfactory seal have been complicated and expensive, and therefore the use of such fasteners has been limited to those uses where substantial expense was justified.

The primary object of the present invention is to provide a sealing separable fastener which is effective in use but which is of relatively simple construction and is therefore inexpensive and practical.

Another object of the invention is to provide a sealing fastener composed of two separate parts, a slide fastener adapted from the conventional zipper and sealing strips loosely attached thereto.

A further object of the invention is to provide, in a sealing fastener, ease of operation to a degree not presently known.

Still another object of the invention is to provide a slider which will interlock the fastener elements in intersecting planes which are not the normal working plane of the fastener.

An additional object of the invention is to provide a fastener which will seal more tightly under conditions of increasing pressure.

It is also an object of the invention to provide a sealing fastener which will provide crosswise strength equal to conventional non-sealing slide fasteners.

Still a further object of the invention is to provide one universal slide fastener which can be coupled to sealing strips fabricated of various materials to meet specific requirements.

Again it is an object of the invention to provide a fastener which will remain sealed throughout the entire length of the closure despite any flexing or working thereof.

Further it is an object of the invention to provide cooperating means between the elements or scoops and sealing strips for allowing the slide fastener to close throughout its length without damage or distortion to the bonded portion of the sealing strips.

Another object of the invention is to provide a closure of this type which need not be heremetically sealed around the diamond of the slider at its terminal location.

According to the invention, I provide extensions to each of the fastener elements which retain the mating edges of the sealing strips in compressed alignment. I also provide a flap as part of the sealing strips which can be bonded over the stitches securing the fastener to the garment or other object, thereby preventing any leakage through the stitching holes. This structure will seal despite dust or other foreign matter (within reason) on the sealing edges. The endurance life of the closure will be comparable to non-sealing zippers. The construction will not require vulcanizing of the fastener tape and consequent deleterious effects on the life of the fabric of the tape. It will, furthermore, be simple for dependable operation and low manufacturing cost.

Further objects and advantages of the invention will appear more fully from the following description especially when taken in conjunction with the accompanying drawings, which form a part thereof.

In the drawings:

FIG. 1 is a plan view of the upper end of the closure as seen from the seal side, the lower end being partly disassembled;

FIG. 2 is an enlarged perspective view of two adjacent fastener elements with part of the sealing strip broken away to show the method of attachment;

FIG. 3 is an enlarged cross-section on the line 3—3 of FIG. 1 showing the intersecting planes in which the fastener halves meet to utilize the hinging principle in the sealing action;

FIG. 4 is an enlarged cross-section on the line 4—4 of FIG. 1 showing the fastener under strain and the resultant compression of the sealing strips as the fastener halves approach a common plane;

FIG. 5 is an enlarged cross-section on the line 5—5 of FIG. 1 showing the means for sealing the upper end of the fastener;

FIG. 6 is a perspective view of the slider;

FIG. 7 is an enlarged view of the scoops of a modified form of fastener; and

FIG. 8 is a view similar to FIG. 4 showing a modification of the invention.

The fastener comprises a single pair of tapes or carriers 2. On the beads 4 of each of these tapes are clamped, in the conventional way, a series of interdigitating spaced fastener elements or scoops 6. Each scoop has a bead 8 and a recess, socket or opening 10 on opposite faces, these beads and openings being conical, or otherwise symmetrical around an axis parallel to the longitudinal axis of the tape, or of such other suitable shape as will allow the bead of one scoop to turn in the socket of the next scoop.

The scoops themselves are not conventional. Each scoop has in its lower edge a groove or slot 12, and on its inner upper corner a surface 14 inclined with respect to the longitudinal axis of the scoop (that is, the line through the centers of beads 8 and beads 4). A projection extends upward from each scoop, this projection preferably consisting of a stem 18 having an enlarged bead 20, forming a beaded pin.

The beads 20 have edge portions 22 which, when the scoops have their longitudinal axes in alignment, in the position of FIG. 4, are spaced from each other. Each set of scoops has associated with it a sealing strip 24 of a suitable elastic material, such as rubber, plastic, impregnated fabric or the like. This strip includes a part 26 which overlies the edges 22 of the projections, the combined thickness of these parts on the two strips being somewhat greater than the space between the edges of the projections on the two sets of scoops, so that, when the scoops are aligned as in FIG. 4 these portions will be compressed against each other to provide a tight seal.

The sealing strips can be secured to the scoops in any suitable manner. Preferably, they are separably connected to the scoops, since this makes for ease of assembly and replacement and also permits the use of tapes of different materials with the same scoops. This is accomplished by providing outwardly directed flanges 28 at the inner edges of parts 26, these flanges having holes 30 of the same diameter as pins 18 and capable of being snapped over beads 20. The strips 24 extend outwardly about the same distance as tapes 2, or as far as may be necessary. If the tape is connected to the parts 32 of the garment or the like, the opening between the edges of which is to be closed by the fastener, by stitching 34, the free edges 36 of the sealing strips are preferably bonded to the faces of the parts 32 above the stitching so as to seal the holes made by the stitching.

The slider 7 consists of upper wing 40 and lower wing 42 arranged parallel to one another and connected by post 44 to form downwardly convergent channels. The upper wing has no channel forming flanges, but its inner face 46 at the upper end has two parts each sloping upwardly and outwardly at a slight angle to the transverse plane of the slider while its lower end is parallel to such plane These surfaces engage the sloping surfaces 14 of the scoops. The lower wing 42 has inwardly directed flanges 48 engaging in grooves 12 in the scoops, the free edges of these flanges being outwardly inclined, the angle of inclination varying from one end to the other in the same sense and to the same degree as lower surface 46 of the upper wing.

With this arrangement, as the slider is moved upwardly to close the fastener, the scoops entering the divided end of the channel in the slider first assume a slight angle to each other, as shown in FIG. 5, this angle being produced by engagement of the angular surfaces 14 with the lower face 46 of upper wing 40 and by the inclination of the upper edge of flange 48 in grooves 12. As the angles of these surfaces change, the scoops on approaching the lower end of the slider, where they are interlocked, assume the positions shown in FIG. 3, in which their longitudinal axes form a substantial obtuse angle, the apex of which is directed towards the sealing strips. The sealing parts 26 are lightly engaged. Now, when the scoops leave the slider, any tension on the fabric parts 32 causes the scoops to turn into aligned position as in FIG. 4, and the sealing parts 26 are compressed against each other to provide a tight fit. Even if no pull is exerted, there is a tendency for the scoops to straighten out when released from the slides.

The scoops can also be brought to the inclined interlocking position by reducing the distance between the inwardly directed flanges 48 of the lower wing of the slider, as in FIG. 3, until the width of the upper wing 40 and/or the resistance of the parts 26 forces the tops of the scoops outwardly to the required angular position shown.

In order to seal the upper end of the fastener, the edges of the two sealing strips may be bonded together as at 50. In order to guide the slider above this point, without exerting a pull on this seal, the flange 28 is provided with slots 52, so that, as shown in FIG. 5, the scoops may move apart without tending to pull the sealing strips apart. In this manner, the slider can be terminally located above the opening in the sealing strips and cannot affect the sealing qualities of the fastener.

The slider may be operated by a conventional pivoted pull tab 54 of any suitable form hinged on the outside of lower wall 42 on the side opposite from sealing strips 24.

If desired, as shown in FIG. 7, the beads 8' and the recesses 10' of scoops 6' may be made of slightly elliptical shape, with the major axes of the ellipses parallel to each other. There is sufficient play in the fastener to allow these beads and recesses to engage even at an angle to each other, as in FIG. 3, yet when engaged a camming action is exerted tending to turn the scoops to the aligned position of FIG. 4.

In the form of FIG. 8, the flanges 28 extend far enough for their free edges 56 to be bonded to the innerfaces of sealing strips 24.

While I have described herein one embodiment of my invention, I wish it to be understood that I do not intend to limit myself thereby except within the scope of the claims hereto or hereinafter appended.

I claim:

1. A sealing separable fastener comprising a single pair of elongated carriers having interdigitating scoops along adjacent edges, said scoops having cooperating beads and recesses which are substantially symmetrical around an axis parallel to the edges of the carriers, said scoops having projections therefrom transverse to the longitudinal axis of the scoops, said projections having facing edges providing a space therebetween when the scoops are interlocked and the longitudinal axis of the scoops on the two carriers are coplanar, an elongated body of elastic material secured on the projections of the scoops of each carrier overlying the facing edges of the projections, the combined thickness of the portions of said elastic bodies overlying such edges being normally greater than said space, and a slider having converging channels engaging said scoops for engaging and releasing the same, at least the narrower part of said channel in which the scoops are interengaged and the scoops having cooperating means thereon for guiding the scoops of the two carriers to positions in which their longitudinal axes form a substantial angle with one another, the apex of said angle pointing towards the side of the scoops on which the projections are located.

2. In a fastener as claimed in claim 1, said slider having spaced wings and a rigid post connecting the wings, the wing on the side of the projection being free of channel-forming flanges.

3. In a fastener as claimed in claim 2, the other wing having inwardly directed flanges and said scoops having grooves therein engaging said flanges.

4. In a fastener as claimed in claim 1, said slider having spaced wings and a rigid post connecting the wings, slider manipulating means carried by the wing on the opposite side of the slider from such projections.

5. In a fastener as claimed in claim 1, said projections comprising pins having beads thereon extending away from the plane of the carriers, said body of elastic material body having holes therein engageable over the heads of said pins and of less dimension, at least in the direction of the longitudinal axis of the carriers, than said beads.

6. In a fastener as claimed in claim 5, said elastic bodies having extensions from the portions overlying the edges of the projections in which said holes are formed, said elastic bodies overlying the beads of said pins and extending outwardly beyond the scoops.

7. In a fastener as claimed in claim 1, said elastic bodies having extensions, from the portions overlying the edges of the projections, overlying and extending outwardly beyond the scoops.

8. In a fastener as claimed in claim 1, said projections comprising pins having beads thereon extending away from the plane of the carriers, said body of elastic material having holes therein engageable over the beads of said pins and of less dimensions than said beads, means sealing the portions of the elastic bodies which overlie the edges of the projections, the elastic bodies beyond such point in the closing direction of the slider having slots elongated in a direction transverse to the longitudinal axes of the carriers engaged over said beads.

9. In a fastener as claimed in claim 1, said angle decreasing towards the wider end of the channel.

10. A sealing separable fastener comprising a single pair of elongated carriers having interdigitating scoops along adjacent edges, said scoops having cooperating beads and recesses which are of such shape as to permit turning of the scoops with respect to one another about the longitudinal axis of engagement thereof, said scoops having projections therefrom transverse to the longitudinal axes of the scoops, said projections having interengaging sealing means thereon operable by turning of said scoops from a position in which the longitudinal axes of the scoops form a substantial angle with each other the apex of which points towards said projections to a position in which such longitudinal axes are coplanar, and a slider having means engaging said scoops for engaging and releasing them, said slider including means for guiding said scoops into interengaged condition in positions in which their longitudinal axes form such substantial angle with each other.

11. A sealing separable fastener comprising a single pair of elongated carriers having interdigitating scoops along adjacent edges, said scoops having cooperating beads and recesses which are substantially symmetrical around an axis parallel to the edges of the carriers, said scoops having projections therefrom transverse to the longitudinal axes of the scoops, said projections having facing edges providing a space therebetween when the scoops are interlocked and the longitudinal axes of the scoops on the two carriers are coplanar, an elongated body of elastic material secured on the projections of the scoops of each carrier overlying the facing edges of the projections, the combined thickness of the portions of said elastic bodies overlying such edges being normally greater than said space, and a slider having converging channels engaging said scoops for engaging and releasing the same, said slider having spaced wings and a rigid post connecting said wings, at least the narrower part of said channel in which the scoops are interengaged and the scoops having cooperating means thereon to cause the interengaging scoops to assume a substantial angle with one another, the apex of said angle pointing towards the side of the scoops on which the projections are located.

12. In combination with a pair of parts having edges which are to be releasably connected, a fastener as claimed in claim 1 having the carriers secured to such edges of the parts.

13. In a combination as claimed in claim 12, said elastic bodies having extensions, from the portions overlying the edges of the projections, overlying the scoops and extending outwardly beyond the scoops and secured to said parts.

14. In a combination as claimed in claim 13, in which stitching is provided connecting said carriers to said parts, said elastic body extensions overlying said stitching.

References Cited in the file of this patent

UNITED STATES PATENTS

| | | |
|---|---|---|
| 504,038 | Judson | Aug. 29, 1893 |
| 2,097,475 | Silberman | Nov. 2, 1937 |
| 2,160,819 | Behrens | June 6, 1939 |
| 2,160,879 | Lawson | June 6, 1939 |
| 2,275,454 | Miller | Mar. 10, 1942 |
| 2,306,873 | Feist | Dec. 29, 1942 |
| 2,875,491 | Morin | Mar. 3, 1959 |

FOREIGN PATENTS

| | | |
|---|---|---|
| 201,777 | Australia | May 10, 1955 |
| 422,662 | Great Britain | Jan. 16, 1935 |
| 447,000 | Great Britain | May 11, 1936 |
| 677,574 | Great Britain | Aug. 20, 1952 |